(12) United States Patent
McCrea

(10) Patent No.: US 11,122,742 B2
(45) Date of Patent: Sep. 21, 2021

(54) CROSS AUGER MOUNTING DEVICE FOR FLEXIBLE HARVESTING HEADER

(71) Applicant: AG Shield Ltd., Benito (CA)

(72) Inventor: Thomas E. McCrea, Benito (CA)

(73) Assignee: AG Shield Ltd., Benito (CA)

( * ) Notice: Subject to any disclaimer, the term of this patent is extended or adjusted under 35 U.S.C. 154(b) by 328 days.

(21) Appl. No.: 16/269,955

(22) Filed: Feb. 7, 2019

(65) Prior Publication Data

US 2019/0239433 A1 Aug. 8, 2019

Related U.S. Application Data

(60) Provisional application No. 62/627,506, filed on Feb. 7, 2018.

(51) Int. Cl.
| | |
|---|---|
| *A01D 47/00* | (2006.01) |
| *A01D 23/06* | (2006.01) |
| *A01D 34/416* | (2006.01) |
| *A01D 34/53* | (2006.01) |
| *A01F 29/12* | (2006.01) |
| *A01D 43/063* | (2006.01) |
| A01D 23/02 | (2006.01) |

(52) U.S. Cl.
CPC ............ *A01D 47/00* (2013.01); *A01D 23/06* (2013.01); *A01D 34/416* (2013.01); *A01D 34/53* (2013.01); *A01D 43/0636* (2013.01); *A01F 29/12* (2013.01); *A01D 2023/024* (2013.01)

(58) Field of Classification Search
CPC ...... A01D 47/00; A01D 23/06; A01D 34/416; A01D 34/53; A01D 43/0636; A01D 2023/024; A01D 41/14; A01D 61/004; A01D 41/142; A01D 61/002; A01D 41/144; A01D 61/008; A01D 34/04; A01F 29/12

See application file for complete search history.

(56) References Cited

U.S. PATENT DOCUMENTS

| | | | | |
|---|---|---|---|---|
| 4,487,004 | A * | 12/1984 | Kejr | A01D 41/14 |
| | | | | 56/14.4 |
| 9,820,434 | B2 * | 11/2017 | McCrea | A01D 34/14 |
| 10,477,767 | B2 * | 11/2019 | Modak | A01D 61/008 |
| 10,477,770 | B2 * | 11/2019 | Modak | A01D 41/142 |
| 2014/0075906 | A1 * | 3/2014 | Heim | A01D 45/021 |
| | | | | 56/105 |

(Continued)

*Primary Examiner* — Arpad Fabian-Kovacs

(74) *Attorney, Agent, or Firm* — Ryan W. Dupuis; Kyle R. Satterthwaite; Ade & Company Inc.

(57) ABSTRACT

When using a cross auger assembly on a crop harvesting header with a flexible frame having end frame sections pivotal relative to a centre frame section, mounting devices are coupled between the bearing housings at opposing ends of the cross auger assembly and the outer ends of the end frame sections. Each mounting device includes a first mounting structure fixed relative to the outer end of the end frame section, a second mounting structure fixed to a portion of the respective bearing housing, and a flexible mounting arrangement between the mounting structures to accommodate variation in lateral positioning of the bearing housings relative to the ends of the flexible frame as the flexible frame flexes over varying ground contours without requiring a telescoping shaft arrangement on the cross auger assembly.

10 Claims, 12 Drawing Sheets

(56) References Cited

U.S. PATENT DOCUMENTS

2014/0075909 A1* 3/2014 Bomleny ............. A01D 41/144
56/119
2018/0168102 A1* 6/2018 Saraiva ................ A01D 41/142
2018/0368320 A1* 12/2018 Schulze Selting ..... A01D 57/20

* cited by examiner

CROSS AUGER MOUNTING DEVICE FOR FLEXIBLE HARVESTING HEADER

This application claims the benefit under 35 U.S.C. 119(e) of U.S. provisional application Ser. No. 62/627,506, filed Feb. 7, 2018.

FIELD OF THE INVENTION

The present invention relates to a mounting device that rotatably supports opposing ends of a cross auger shaft assembly relative to the respective outer ends of a harvesting header, and more particularly, the present invention relates to a mounting device suited for supporting the opposing ends of the cross auger shaft in a flexible harvesting header having a flexible main frame structure including a centre frame section and a pair of end frame sections which pivot relative to the centre frame section so that the frame sections can deflect upwardly and downwardly at varying angular orientations relative to one another for following ground contours.

BACKGROUND

Crop harvesting machines, including swathers and combines, generally make use of a crop harvesting header for cutting and gathering the crop to be subsequently i) discharged in a windrow along the ground in the instance of a swather, or ii) separated into grain and chaff in the instance of a combine.

A crop harvesting header generally includes a main frame structure having a length extending generally at right angles to forward movement of the harvester across the ground. Frame members extending forwardly from the main frame structure of the header support a crop receiving table locating a cutter bar across the front end of the table for cutting crop to be deposited onto the table. A backboard extends upwardly from a rear of the table and includes a central discharge opening therein from which gathered cut crop is discharged rearwardly from the header. Side drapers are provided on either side of the central discharge opening to span from the central discharge opening towards opposing ends of the table for conveying cut crop thereon from the respective ends of the header to the central discharge opening. In certain crop conditions where it is known for cut crop to ride upwardly along the backboard of the header, a cross auger assembly is known to be used in the form of one or more auger sections extending laterally across the header forwardly of the backboard so as to be spaced above the rear end of the side drapers of the table. The cross auger includes flighting oriented to guide material collecting at the backboard inwardly towards the central discharge opening.

Headers for combine harvesters are typically mounted on the feeder house of the combine to allow some floating action of the header relative to the feeder house so that the cutter bar can rest on the ground and float over the ground responsive to ground contours in a cutting action. To optimally follow ground contours, various attempts have been made to introduce some flexibility into the header. U.S. Pat. No. 6,675,568 by Patterson et al, the disclosure of which is incorporated herein by reference, discloses one example of a multi-section header with a flexible crop cutting knife for this purpose. The main frame structure of the header is formed in multiple sections including a centre frame section and two end frame sections which are pivotal relative to the centre frame section by a balancing linkage coupling each end frame section to the centre frame section such that the frame sections can vary upwardly and downwardly at varying angular orientations relative to one another for following ground contours.

When using a flexible multi-section header according to U.S. Pat. No. 6,675,568, the distance from the outer end of each end frame section from a center of the header can vary as the angular orientation of the frame sections vary relative to one another. When the outer ends of the cross auger assembly are rotatably supported by respective bearing housings mounted on the outer ends of the end frame sections of the main frame structure, telescoping shafts are typically provided between the adjacent sections of the cross auger to allow rotational drive to be transferred across the adjacent sections of the cross auger while also allowing the overall length of the cross auger sections between a central support and the outer ends of the cross auger sections for accommodating the varying distance of the outer end of each end frame section from the center of the header as the header flexes. The telescoping shafts must accommodate for off-axis forces as the header flexes while transferring rotational drive forces from one cross auger shaft section to the next and are thus prone to premature wear. Attempts to grease the telescopic shafts has limited success as the centrifugal force of the rotation auger shaft tends to throw the grease radially outwardly and away from the telescoping shaft.

SUMMARY OF THE INVENTION

According to one aspect of the invention there is provided a mounting device for a cross auger in a crop harvesting header, in which the crop harvesting header comprises:

a flexible main frame including a centre frame section for mounting onto a harvester and a pair of end frame sections extending laterally outwardly from the centre frame section in opposing lateral directions towards respective outer ends defining a width of the header for movement in a forward working direction generally at right angles to the width across ground including crop to be harvested in which the end sections are pivotal relative to the center frame section for following contours of the ground;

a crop receiving table carried on the main frame across the width of the header;

a cutter bar across a front of the table carrying a cutter knife operable for cutting the crop as the header is moved forwardly across the ground in the forward working direction for depositing the crop onto the table;

a backboard extending upwardly from a rear of the table across the width of the header and including a rear discharge opening therein for discharging the crop from a central discharge location at the rear of the table;

a first side draper for conveying cut crop along the receiving table from a first end of the header to the central discharge location;

a second side draper for conveying cut crop along the receiving table from a second end of the header to the central discharge location;

the cross auger including a cross auger shaft assembly rotatably carried on the main frame to extend in the lateral direction above the rear of the table between opposing ends of the cross auger shaft assembly, forwardly of the backboard and spaced above the first and second side drapers;

the cross auger shaft assembly including auger flighting mounted thereon that is oriented for guiding cut crop from both ends of the header towards the central discharge location as the cross auger shaft assembly is rotated;

a pair of bearing housings rotatably supporting the opposing ends of the cross auger shaft assembly therein respectively adjacent respective ones of the outer ends of the end frame sections;

the mounting device comprising:

a first mounting structure for mounting in fixed relation to the outer end of one of the end frame sections of the main frame;

a second mounting structure for mounting in fixed relation to a corresponding one of the bearing housings; and a flexible mounting arrangement coupling the second mounting structure to the first mounting structure such that the bearing housing is movable relative to the respective outer end of the end frame section generally in the lateral direction that the cross auger shaft assembly extends as the end sections of the flexible main frame are pivoted relative to the center section of the flexible main frame.

According to a second aspect of the present invention there is provided a crop harvesting header for a harvester, the header comprising:

a flexible main frame including a centre frame section for mounting onto a harvester and a pair of end frame sections extending laterally outwardly from the centre frame section in opposing lateral directions towards respective outer ends defining a width of the header for movement in a forward working direction generally at right angles to the width across ground including crop to be harvested in which the end sections are pivotal relative to the center frame section for following contours of the ground;

a crop receiving table carried on the main frame across the width of the header;

a cutter bar across a front of the table carrying a cutter knife operable for cutting the crop as the header is moved forwardly across the ground in the forward working direction for depositing the crop onto the table;

a backboard extending upwardly from a rear of the table across the width of the header and including a rear discharge opening therein for discharging the crop from a central discharge location at the rear of the table;

a first side draper for conveying cut crop along the receiving table from a first end of the header to the central discharge location;

a second side draper for conveying cut crop along the receiving table from a second end of the header to the central discharge location;

a cross auger including a cross auger shaft assembly rotatably carried on the main frame to extend in the lateral direction above the rear of the table between opposing ends of the cross auger shaft assembly, forwardly of the backboard and spaced above the first and second side drapers;

the cross auger shaft assembly including auger flighting mounted thereon that is oriented for guiding cut crop from both ends of the header towards the central discharge location as the cross auger shaft assembly is rotated;

a pair of bearing housings rotatably supporting the opposing ends of the cross auger shaft assembly therein respectively adjacent respective ones of the outer ends of the end frame sections;

the mounting device comprising:

a first mounting structure for mounting in fixed relation to the outer end of one of the end frame sections of the main frame;

a second mounting structure for mounting in fixed relation to a corresponding one of the bearing housings; and a flexible mounting arrangement coupling the second mounting structure to the first mounting structure such that the bearing housing is movable relative to the respective outer end of the end frame section generally in the lateral direction that the cross auger shaft assembly extends as the end sections of the flexible main frame are pivoted relative to the center section of the flexible main frame.

The flexible mounting arrangement of the mounting device between the bearing housing and the outer end of the main frame of the header allows the cross auger shaft to remain substantially fixed in length along the axis thereof between bearing supports so as to eliminate the need for a telescoping shaft portion between adjacent sections of the cross auger shaft, thus eliminating an element of frequent failure in the conventional cross auger assembly.

According to one embodiment, the flexible mounting arrangement preferably comprises a slider coupling the second mounting structure to the first mounting structure for relative linear sliding movement in the lateral direction that the cross auger shaft assembly extends.

According to a further embodiment the flexible mounting arrangement may comprise a pivot link which is pivotally coupled on one of the first and second mounting structures about a first pivot axis and which is pivotally coupled on another one of the first and second mounting structures about a second pivot axis spaced below the first pivot axis, such that the bearing housing is movable relative to the respective outer end of the end frame section generally in the lateral direction that the cross auger shaft assembly extends as the pivot link is pivoted relative to the first and second mounting structures.

According to yet another embodiment the flexible mounting arrangement may comprises a resilient member supported between the first mounting structure and the second mounting structure such that the resilient member is resilient deformed as the bearing housing is moved relative to the respective outer end of the end frame section generally in the lateral direction that the cross auger shaft assembly extends. The resilient material may undergo a bending deflection as the bearing housing is moved relative to the respective outer end of the end frame section generally in the lateral direction that the cross auger shaft assembly extends.

According to yet another embodiment, in which the flexible mounting arrangement comprises a resilient member supported between the first mounting structure and the second mounting structure, the resilient member comprises a sheet of material arranged to be oriented perpendicularly to the cross auger shaft assembly in a neutral orientation of the end frame sections relative to the centre frame section of the flexible main frame.

A flexible, non-elastic member may be connected between the first and second mounting structures independently of the flexible mounting arrangement when the flexible mounting arrangement is a resilient member. Alternatively, the mounting device may further comprise a rigid ledge member coupled to the first mounting structure and a rigid catch member coupled to the second mounting structure which is supported above the ledge member. In this instance, the catch member is preferably freely movable relative to the ledge member in the lateral direction and the ledge member is preferably arranged to support the catch member thereon to carry the bearing housing on the outer end of the main frame in the event of breakage of the resilient member.

When used in combination with the bearing housings in which the bearing housings each comprise (i) an inner bearing member supported coaxially with an axis of rotation of the cross auger shaft assembly and (ii) an outer bearing member having a mounting flange connected in fixed relation to the second mounting structure and an inner bearing surface that is partly spherical and that supports the inner bearing member therein such that the mounting flange is angularly adjustable relative to the axis of rotation of the cross auger shaft assembly. The mounting device may further comprises a mounting member which is mounted on the second mounting structure and which includes a collar portion engaged with the inner bearing member such that the mounting flange is held at a fixed angular orientation relative to the axis of rotation of the cross auger shaft assembly.

BRIEF DESCRIPTION OF THE DRAWINGS

Various embodiments of the invention will now be described in conjunction with the accompanying drawings in which.

In the drawings like characters of reference indicate corresponding parts in the different figures.

DETAILED DESCRIPTION

Figure 1:
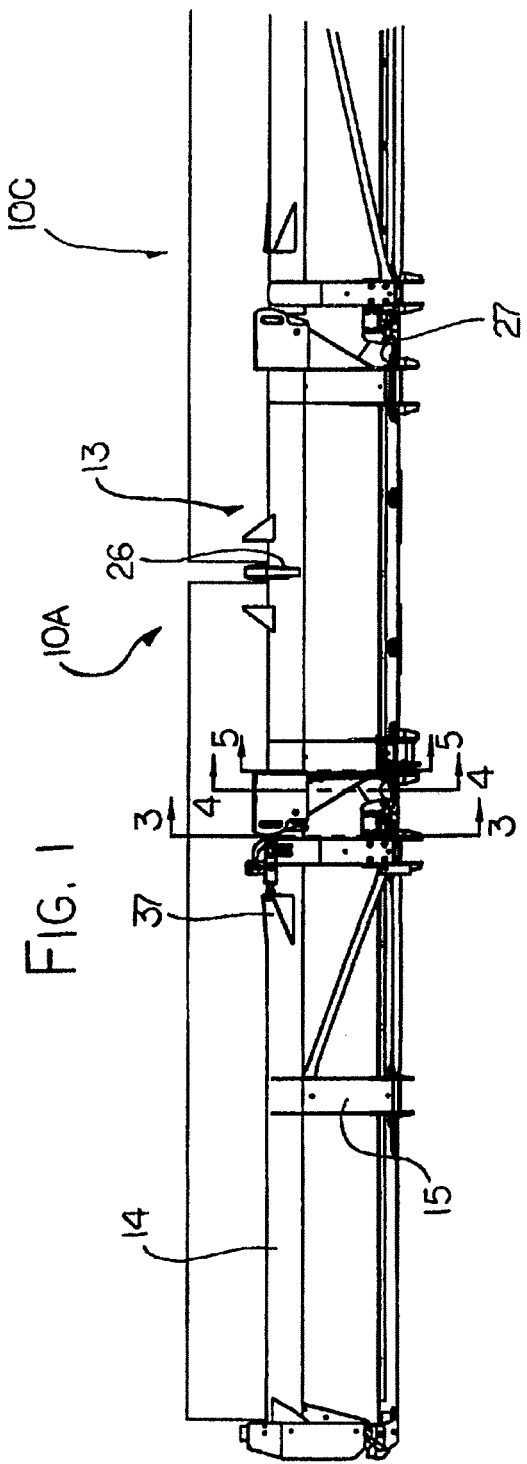
FIG. 1 is a rear elevational view of a conventional flexible harvesting header.

Referring to the accompanying figures, there is illustrated a cross auger mounting device generally indicated by reference numeral 5. The cross auger mounting device is particularly suited for use with an agricultural header 10 manufactured by Macdon Industries Ltd. under the model name FD1 FlexDraper®. U.S. Pat. No. 6,675,568 by Patterson et al, the disclosure of which is incorporated herein by reference discloses the general operation of the header. For convenience, FIGS. 1 through 3 from U.S. Pat. No. 6,675,568 are attached herewith and some of the description with regard to operation of the header from U.S. Pat. No. 6,675,568 is reproduced in the following.

Figure 2:
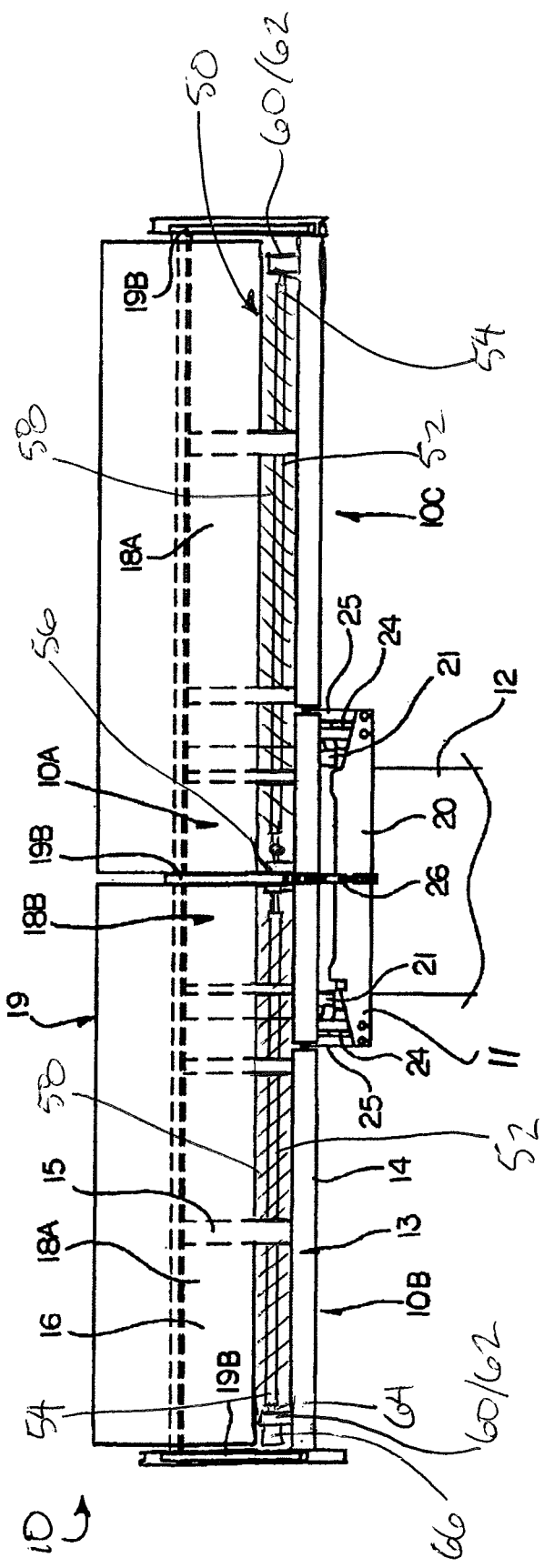
FIG. 2 is a top plan view of the flexible harvesting header according to FIG. 1 shown with a cross auger supported thereon.

FIGS. 1 and 2 show in rear elevational view and in plan view respectively the header 10 carried on an adapter 11 attached to the feeder house 12 of a combine harvester. In FIG. 1 the adapter is omitted for convenience of illustration.

The header 10 includes a frame 13 defined by a main rear beam 14 and a plurality of forwardly extending arms 15 which extend downwardly from the beam 14 and then forwardly underneath a table 16 which extends across the header. At the forward end of the table 16 is provided a cutter bar 17. On top of the table 16 is provided a draper transport system 18 which carries the crop from the cutter bar across the header to a discharge location at the feeder house 12. The draper thus includes two side drapers extending from respective ends of the header inwardly toward the feeder house and a center adapter section 18B which acts to feed the crop from the side drapers 18A rearwardly to the feeder housing.

The header further includes a reel 19 including a beam 19A on which is mounted a plurality of reel bats (not shown) which are carried on the beam 19A for rotation with the beam around the axis of the beam. The beam is carried on reel support arms 19B which extend from the beam rearwardly and upwardly to a support bracket attached to the transverse main beam 14. The reel arms can be raised and lowered by hydraulic cylinders 19D connected between the respective arm and the beam 14.

In the embodiment shown the reel is mounted on three arms 19B including two arms at the ends of the header and a single center arm. However additional arms may be provided so that there are four such arms with two center arms being spaced apart either side of the adapter 11. It is well known to provide an arrangement of the beam 19A and the bats which accommodate flexing movement of the reel so that one end can be higher than the other end without damaging the bats or the reel structure. Various different arrangements for accommodating such flexing movement are known and can be incorporated into the arrangement described herein, as is well known to one skilled in the art.

The adapter 11 comprises a frame 20 which attaches to the feeder house 12 and carries at its lower end a pair of forwardly extending pivotal arms 21 which extend forwardly underneath respective ones of the frame members 15 of the header. The pivotal arms 21 can pivot upwardly and downwardly about a respective pivot pins 23 each independently of the other arm. Each arm is supported by a respective spring 24 carried on a respective stub arm 25 attached to the respective arm 21. Thus, the spring 24 provides tension on the stub arm 25 pulling it upwardly around the pin 23 which acts to pull up the respective arm 21 and provide a lifting force underneath the header at a lifting point partway along the respective frame member 15 and underneath the draper 18 and the table 16.

At the center of the adapter is provided a link 26 which extends from the frame 20 forwardly to the central bracket 19C of the beam arm support brackets. The link 26 is provided in the form of a hydraulic cylinder which allows adjustment of the length of the cylinder thus pivoting the header forwardly and rearwardly about the support point of the arms 21 on the underside of the header. Thus, the attitude of the header, that is the angle of the table 16 to the horizontal can be tilted by operation of the cylinder forming the link 26.

In addition, the attitude of the header about an axis extending forwardly of the direction of movement that is at right angles to the transverse beam 14 is effected by the independent pivotal movement of the arms 21 provided by the springs 24 which act as a floatation system. In addition, the whole header can float upwardly and downwardly on the springs 24 with the link 26 pivoting to accommodate the upward and downward movement and the arms 21 pivoting about the respective pin 23.

The table 16 provides behind the cutter bar 17 a skid plate 16A which is arranged to engage the ground. Thus, upward force is provided from the ground which tends to lift the header taking weight off the support springs 24. In practice the springs are adjusted so that the springs act to support the majority of the weight of the header leaving a relatively small proportion of the weight to rest on the ground. Thus, the header can float upwardly and downwardly as the ground provides areas of different height with one end of the header being movable upwardly independently of the other end by independent flexing of the springs 24. Thus, the header tends to follow the ground level.

The arrangement of the header being formed in a number of sections which are independently pivotal each relative to the next and in which adjustment of the lifting force provided by the springs 24 is transferred to each of the sections proportionally, allows each section to float upwardly and downwardly and allows each section to apply a force to the ground which is proportional to the total force of the whole header.

Thus, the beam 14 is divided into a number of separate pieces depending upon the number of sections of the header. In the embodiment shown there are three sections including a center frame section 10A, a first end frame section 10B and a second end frame section 10C. The center frame section 10A is mounted at the adapter so that the arms 21 extend into engagement with the center section. The end frame sections are pivotally connected to the center frame section such that each can pivot upwardly and downwardly about a respective pivot axis generally parallel to the direction of movement.

Thus, the beam 14 is split into three portions each co-operating with a respective one of the sections 10A, 10B and 10C and defining a main beam therefor. Each section of the beam 14 includes respective ones of the frame members 15 which support the respective portion of the table. Thus, as best shown in FIG. 1, there is a break between the beam sections 14 of the center section 10A and one end frame section 10B. The end most frame member 15A of the end frame section 10B is arranged at the break. The end frame member 15B of the center section 10A is spaced inwardly from the break leaving space for a pivot coupling 27 extending from the frame member 15A to the frame member 15B and defining a pivot pin 27A lying on the pivot axis between the wing section 10B and the center section 10A. In a rear elevational view, the cutter bar 17 is also visible underneath the header at the forward end of the frame members 15 and at the front of the table 16.

In the embodiment shown the cutter bar 17 is split at a junction lying along the axis of a hinge pin so as to provide a pivot within the cutter bar allowing the cutter bar to bend at the junction. In an alternative arrangement (not shown) the cutter bar can be formed in a manner which allows it to flex on the axis of the pin thus avoiding the necessity for a break in the cutter bar. The cutter bar is of conventional shape including a U-shaped member with generally horizontal legs and a front curved nose to which is attached the knife support flange of a conventional nature. The knife support flange includes a plurality of holes for mounting conventional knife guards.

Thus, the two sections 10A and 10B are supported each relative to the other for pivotal movement of the end frame section 10B about an axis extending through the hinge pin and through the break in the cutter bar 17 so that the wing section is supported at its inner end on the center section but can pivot downwardly at its outer end so that the weight at the outboard end is unsupported by the center section and causes downward or counter clockwise pivotal movement of the end frame section 10B.

The end frame section 10C is mounted in an identical or symmetrical manner for pivotal movement about the other end of the center section 10A. The amount of pivotal movement allowed of the end frame section relative to the center section about the axis of the pivot pin is maintained at a small angle generally less than 6° and preferably less than 4° as controlled by suitable mechanical stop members which are provided at a suitable location with the required mechanical strength to support the wing frame section against upward or downward movement beyond the stop members. Suitable stop members can be designed by a person skilled in the art and the details of the stop members are not described herein.

The outboard weight of each end frame section is supported on respective linkages which communicate that weight from the inner end of the beam 14 of the end frame sections through to the support for the center section 10A at the springs 24.

A backboard 30 extends upwardly from a rear of the table towards the main beam at the top end thereof. The backboard 30 defines the rear central discharge opening of the header below the main beam at the rear of the table from which collected cut crop material is discharged from the header into a windrow in the instance of a swather, or into the feeder housing of the combine in the instance of a combine. The backboard 30 is thus formed in two sections in which each section is a rigid sheet extending in the lateral direction from a respective the end of the header to the central discharge opening 31, and extending upwardly from the rear edge of the table to the main beam at the top end of the sheet.

Figure 3:
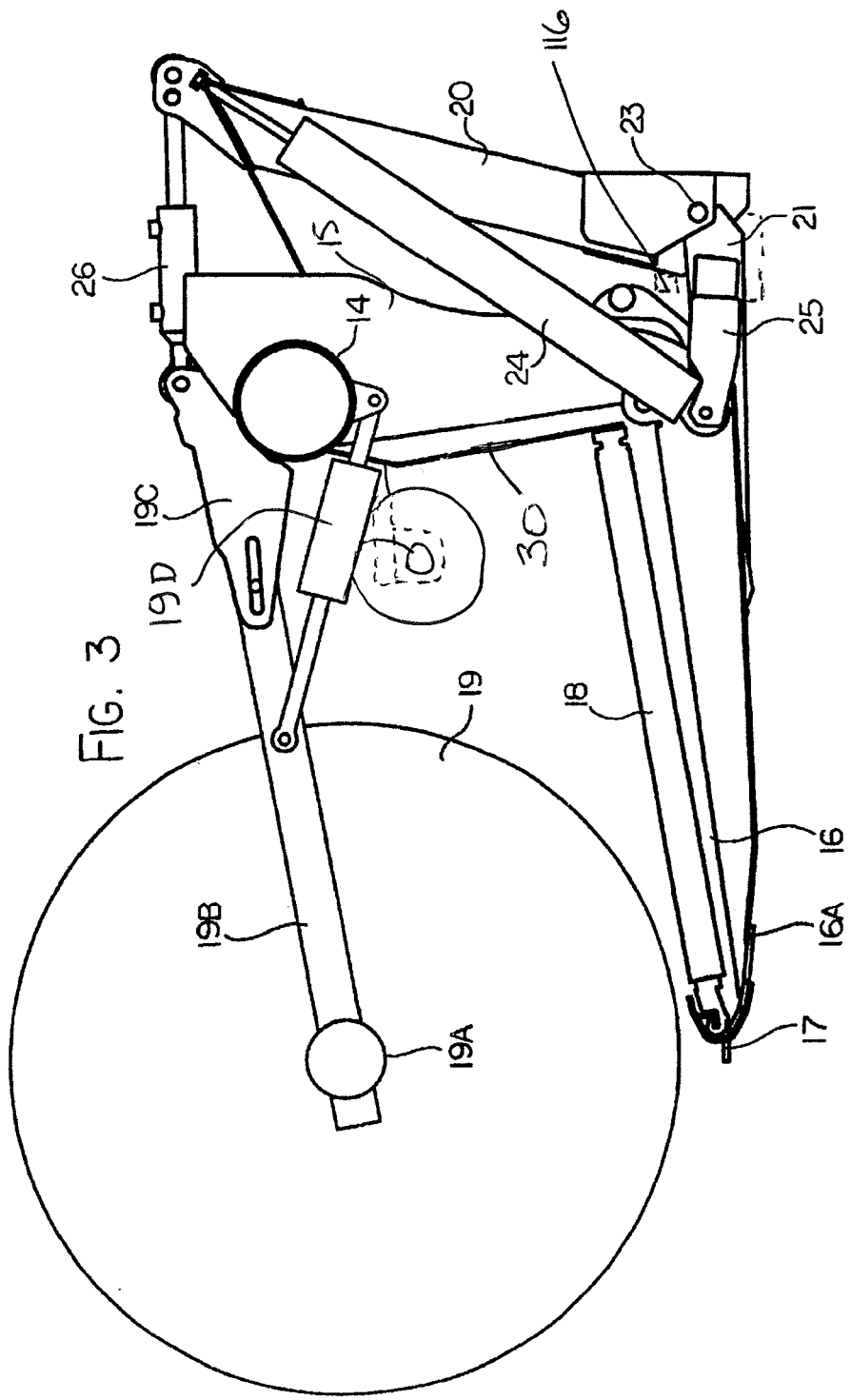
FIG. 3 is an end elevational view of the header according to FIG. 1.
Figure 4:
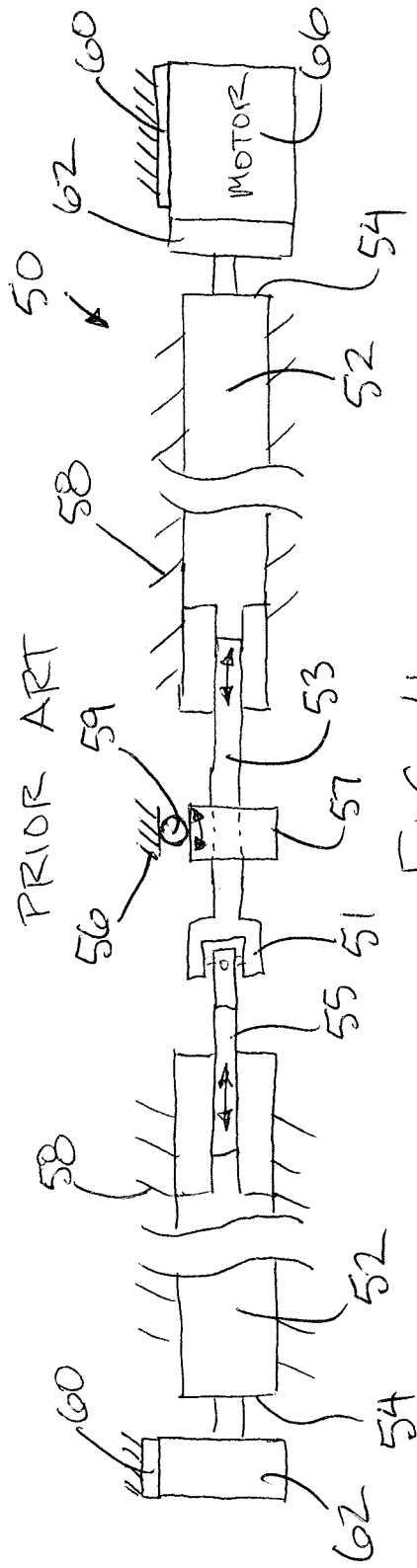
FIG. 4 is a schematic representation of a conventional cross auger assembly.

The header according to FIGS. 1 to 3 also comprises a cross auger assembly 50 represented schematically in greater detail in FIG. 4. The cross auger assembly comprises a cross auger shaft formed in two shaft sections 52. Each shaft section spans from a central location in the lateral direction of the header frame across a length of one end frame section to a respective outer end 54 of the shaft assembly which is located at a respective one of the outer ends of the header frame. Each shaft section 52 includes helical auger flighting 58 supported thereon which is oriented for guiding cut crop material laterally inwardly from both ends of the header across the backboard to the central discharge opening at the rear of the header.

The outer ends of the two shaft sections 52 of the cross auger assembly are rotatably supported on respective outer support brackets 60 which are fixedly mounted onto the outer ends of the two end frame sections of the header frame respectively.

A hydraulic motor 66 is mounted on one of the support brackets 60 at one end of the header frame. The motor 66 includes a rotary output in fixed connection to the outer end of the corresponding cross auger shaft section 52. The motor 66 also includes an integral bearing housing 62 locating rotary bearings therein which rotatably support the rotary output and the outer end of the corresponding cross auger shaft section 52 for rotation relative to the corresponding support bracket 60.

Another bearing housing including internal rotary bearings therein is fixedly mounted onto the support bracket 60 at the other end of the header frame which supports the outer end of the other cross auger shaft section 52 for rotation relative to the header frame.

A centre support arm 56 is mounted fixedly at the centre of the centre frame section. A bearing housing 57 is located on the centre support arm 56 which includes rotary bearings mounted internally therein to provide rotational support to the cross auger shaft assembly received therethrough. Suitable bushings 59 support the bearing housing 57 relative to the centre support arm 56 to allow the bearing housing to be angularly deflected relative to the center frame section of the header in response to upward and downward deflection at the ends of the header frame which deflect the corresponding outer ends of the cross augers sections 52 upwardly and downwardly relative to the centre frame section as well.

A first telescopic shaft portion 53 is received rotatably within the bearing housing 57 and is telescopically received within the inner end of one of the cross auger shaft sections on one side of the bearing housing 57. The first telescopic shaft portion 53 can be deflected off axis with the bearing housing 57 relative to the central support arm 56 by the resilient deformation of the bushing 59. At the other side of the bearing housing 57, a universal joint 51 couples the first telescopic shaft portion 53 to a second telescopic shaft portion 55 that is telescopically received within the inner end of the other cross auger shaft section 52. In this manner, both cross auger shaft sections 52 can vary in overall length from the central bearing housing 57 while also enabling the two shaft sections to be angularly deflected relative to one another from a neutral orientation in which the shaft sections are co-linear and generally parallel to the lateral direction of the centre frame section to a deflected position in which the shaft sections are angularly deflected relative to one another responsive to angular deflections of the end frame sections of the header frame relative to one another. The telescopic shaft portions are non-circular and having a profile that mates with the profile of the surrounding sleeves within the inner ends of the shaft to enable rotational drive to be transferred from one cross auger shaft section to the other cross auger section across the telescopic shaft sections.

Turning now to the cross auger mounting device 5 according to the present invention, the cross auger mounting device 5 serves to mount each bearing housing 62 relative to the outer support bracket 60 at each end of the header in a flexible manner which allows the bearing housing to be displaced relative to the outer end of the frame of the header in the lateral direction that the cross auger extends so that the bearing housing can remain fixed in the lateral direction relative to the cross auger shaft assembly and the cross auger shaft sections 52 can remain fixed in length relative to the central support arm 56, thus eliminating the requirement for telescoping inner shaft portions 53 and 55 described above.

Figure 5:
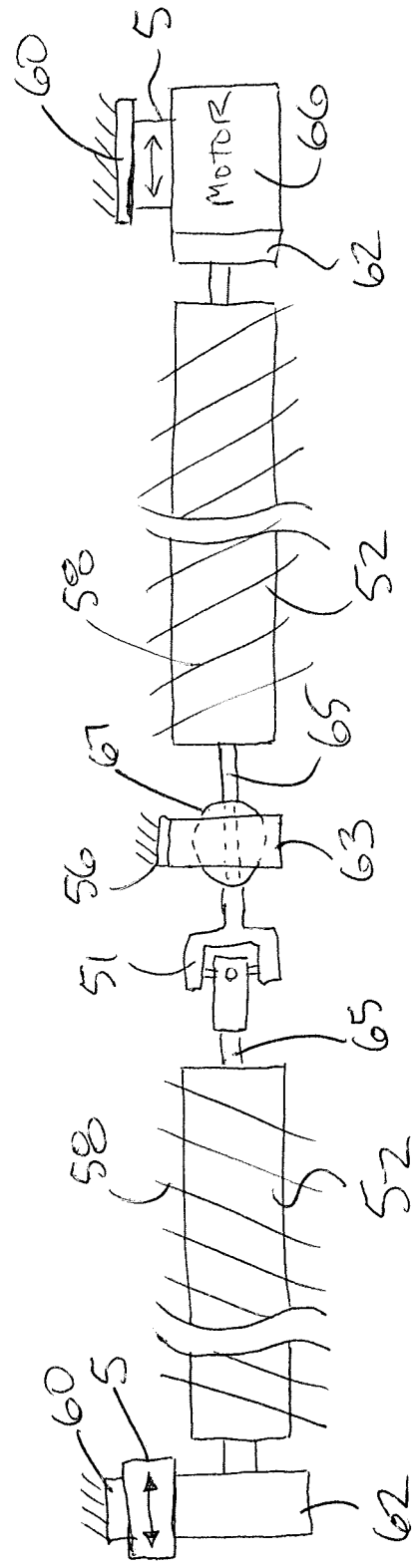
FIG. 5 is a schematic representation of a cross auger assembly supported by the cross auger mounting device according to the present invention.
Figure 6:
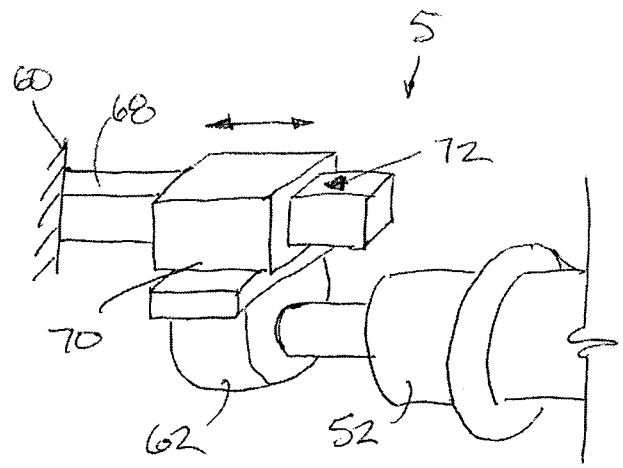
FIG. 6 is a schematic representation of the cross auger mounting device according to a first embodiment of the present invention.
Figure 7:
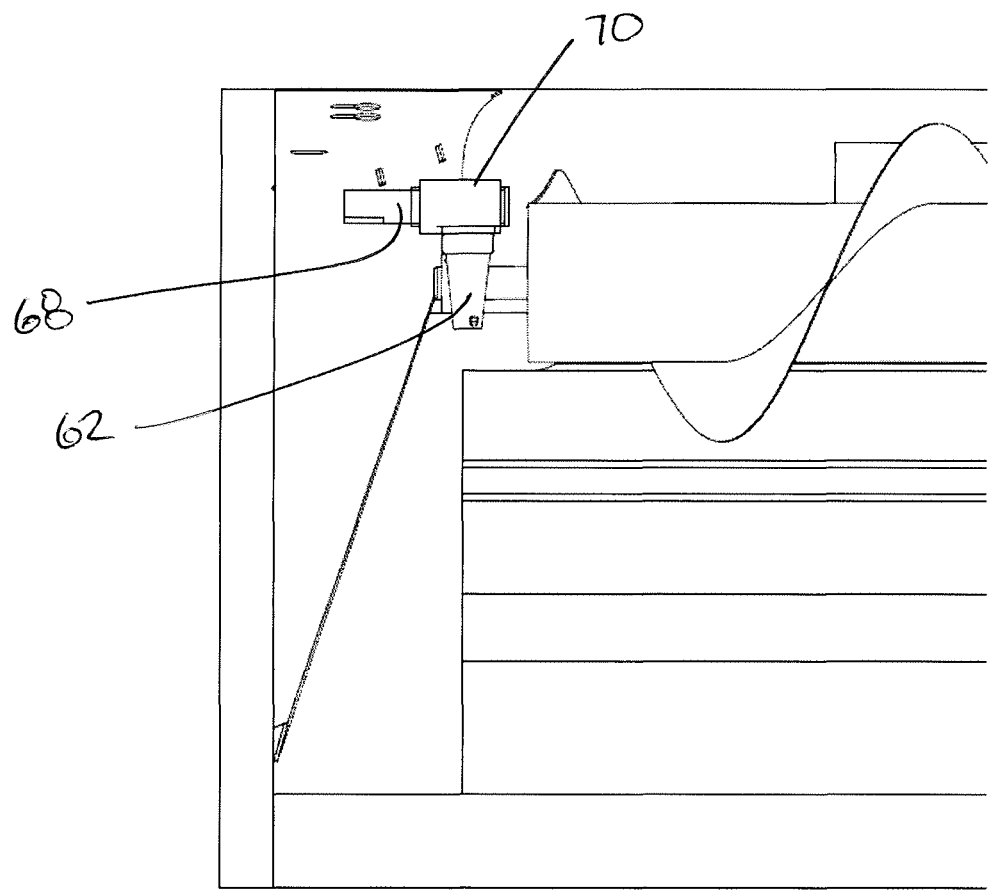
FIG. 7 is a front elevational view of the cross auger mounting device according to the first embodiment of FIG. 6 in a neutral orientation of the header frame.
Figure 8:
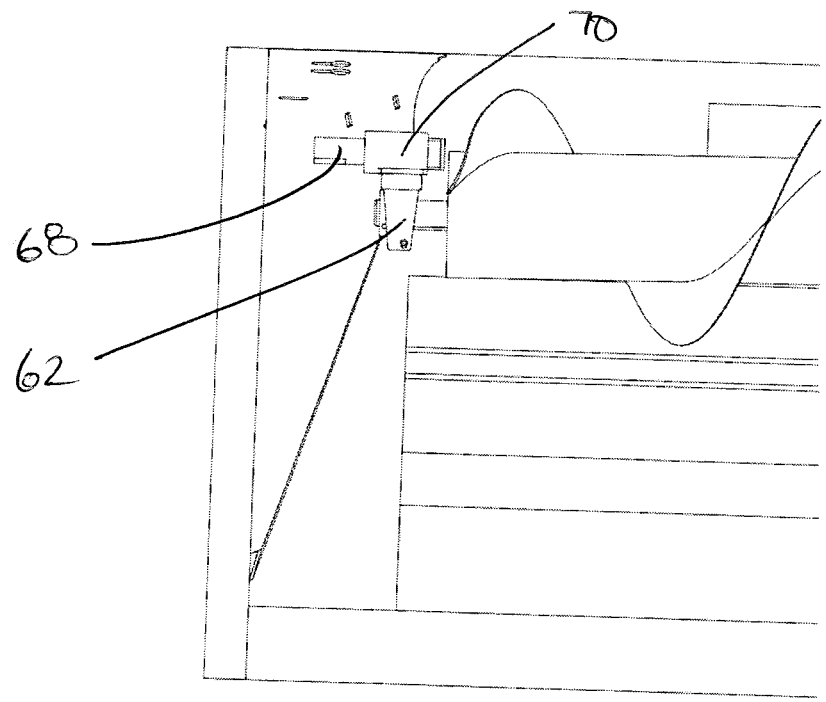
FIG. 8 is a front elevational view of the cross auger mounting device according to the first embodiment of FIG. 6 in which the outer end of the header frame is deflected upwardly from the neutral orientation relative to the centre frame section.
Figure 9:
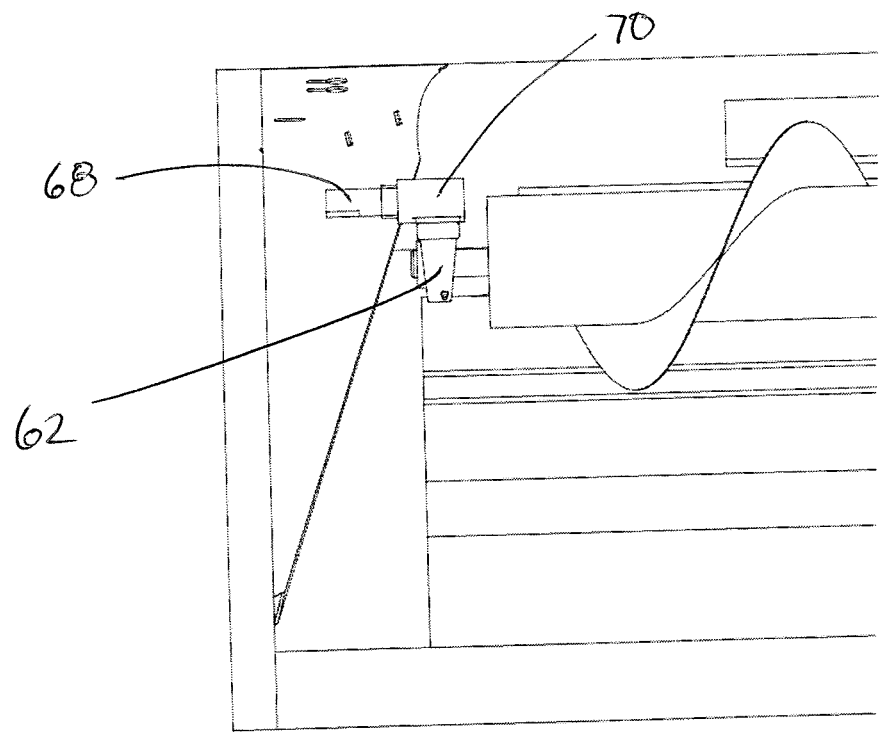
FIG. 9 is a front elevational view of the cross auger mounting device according to the first embodiment of FIG. 6 in which the outer end of the header frame is deflected downwardly from the neutral orientation relative to the centre frame section.
Figure 10:
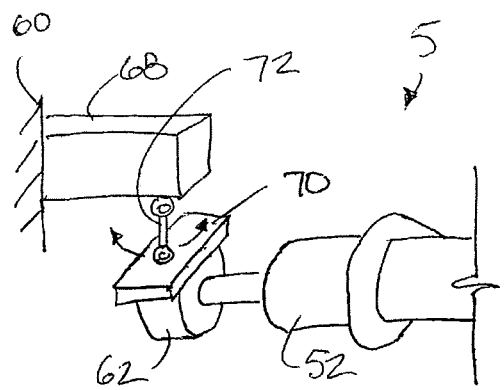
FIG. 10 is a schematic representation of the cross auger mounting device according to a second embodiment of the present invention.
Figure 11:
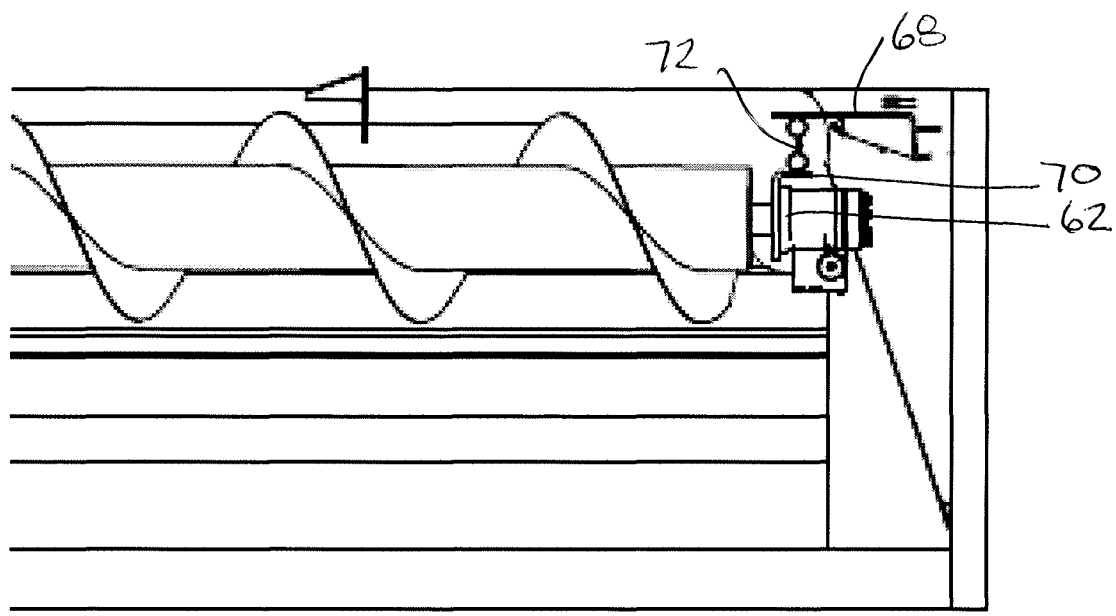
FIG. 11 is a front elevational view of the cross auger mounting device according to the second embodiment of FIG. 10 in a neutral orientation of the header frame.

According to the present invention as represented schematically in FIG. 5, the inner ends of the cross auger shaft sections 52 each include an inner shaft portion 65 which is fixed and non-extendable in the axial direction relative to the corresponding shaft section 52. One of the inner shaft portions 65 is received through a central bearing housing 63 which is supported on the central support arm 56 (in place of the bearing housing 57 noted above) such that the end of the inner shaft portion opposite the respective shaft section 52 is joined by the universal joint 51 to the inner shaft portion 65 of the other cross auger shaft section 52. The central bearing housing 63 includes a central bearing portion which rotatable supports the shaft portion 65 for rotation about the longitudinal axis thereof, and an outer bearing portion which has a spherical outer surface 67 received within a corresponding spherical cavity to allow deflection of the auger shaft away from a neutral orientation of the axis. The universal joint 51 allows the other cross auger shaft section to be deflected away from the neutral orientation of the axis thereof.

By allowing the outer ends of the cross auger shaft sections to be supported on bearing housings which can be laterally deflected relative to the outer ends of the header frame, the cross auger shaft sections 52 can remain substantially fixed in length relative to the central support arm 56, thus eliminating the requirement for the telescopic inner shaft portions 53 and 55 according to the prior art arrangement of FIG. 4.

Although various embodiments of the flexible mounting device 5 are illustrated in the accompanying figures and described herein, the common features of the various embodiments will first be described.

In each instance the mounting device includes a first mounting structure 68 which is arranged to be mounted in fixed relation to the outer support bracket 60 and a second mounting structure 70 which is arranged to be mounted in fixed relation to the bearing housing 62 which rotatably receives the outer end of a respective one of the shaft sections 52 of the cross auger therein. The mounting device further includes a flexible mounting arrangement 72 which allows the second mounting structure 70 to be displaced by at least one degree of freedom relative to the first mounting structure 68 in a direction which is generally aligned with the lateral direction that the axis of the cross auger section extends.

As the end frame sections are pivoted relative to the centre frame section, the distance between the outer end of each end frame section relative to a central location on the centre frame at the location of the centre support arm 56 will change.

As a result of the outer end of the auger shaft section 52 being displaced about a larger arc than the outer end of the end frame section, the outer end of each auger shaft section 52 will vary slightly in the lateral direction of the auger axis relative to the respective outer end of the header frame upon which it is supported. This variation in distance between the outer end of the auger shaft section and the outer end of the end frame section is accommodated for by the flexible mounting arrangement 72 of the mounting device 5 described herein.

According to the first embodiment shown in FIGS. 4 through 7, the first mounting structure in this instance comprises an elongate beam or bar oriented in the lateral direction of the header while the second mounting structure 70 comprises a collar upon which the bearing housing 62 is fixed. The flexible mounting arrangement comprises the sliding connection of the collar 70 supported on the beam 68 for relative sliding movement in the lateral direction of the header. As the outer end of the header frame is deflected upwardly in FIG. 6 relative to the neutral orientation of FIG. 5, the collar is slidably displaced outwardly along the beam. Alternatively, when the outer end of the header frame is deflected downwardly in FIG. 7 relative to the neutral orientation, the collar is slidably displaced inwardly along the beam.

According to the second embodiment shown in FIGS. 8 through 11, the first mounting structure 68 in this instance comprises a rigid bracket member including a pivot defining a first pivot axis oriented in the forward working direction of the header at a fixed location on the bracket member. The second mounting structure 70 in this instance comprises a rigid bracket member including a pivot defining a second pivot axis oriented in the forward working direction of the header at a fixed location on the bracket member. The flexible mounting arrangement in this instance comprises a pivot link 72 which extends generally vertically between a top end pivotally coupled on the pivot of the first mounting structure 68 and a bottom end pivotally coupled on the pivot of the second mounting structure 70. In this manner the bearing housing 62 is suspended below the fixed mounting bracket 68 on the header frame. As the bottom end of the pivot link is displaced in an arcuate path about the first pivot axis on the bracket 68, the bearing housing 62 is effectively displaced in the lateral direction of the cross auger relative to the outer end of the frame of the header.

Figure 12:
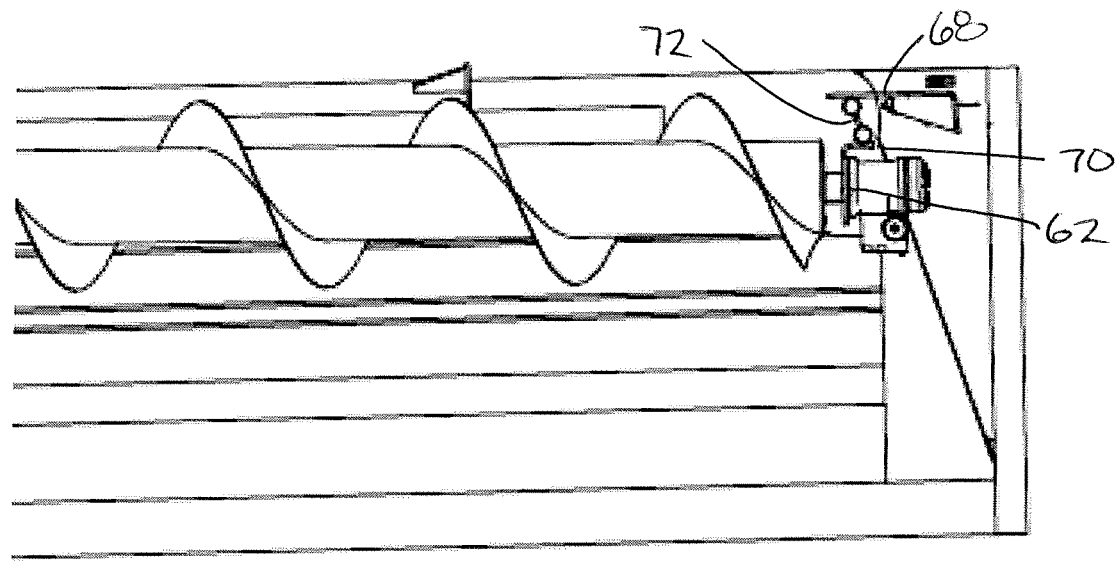
FIG. 12 is a front elevational view of the cross auger mounting device according to the second embodiment of FIG. 10 in which the outer end of the header frame is deflected downwardly from the neutral orientation relative to the centre frame section.
Figure 13:
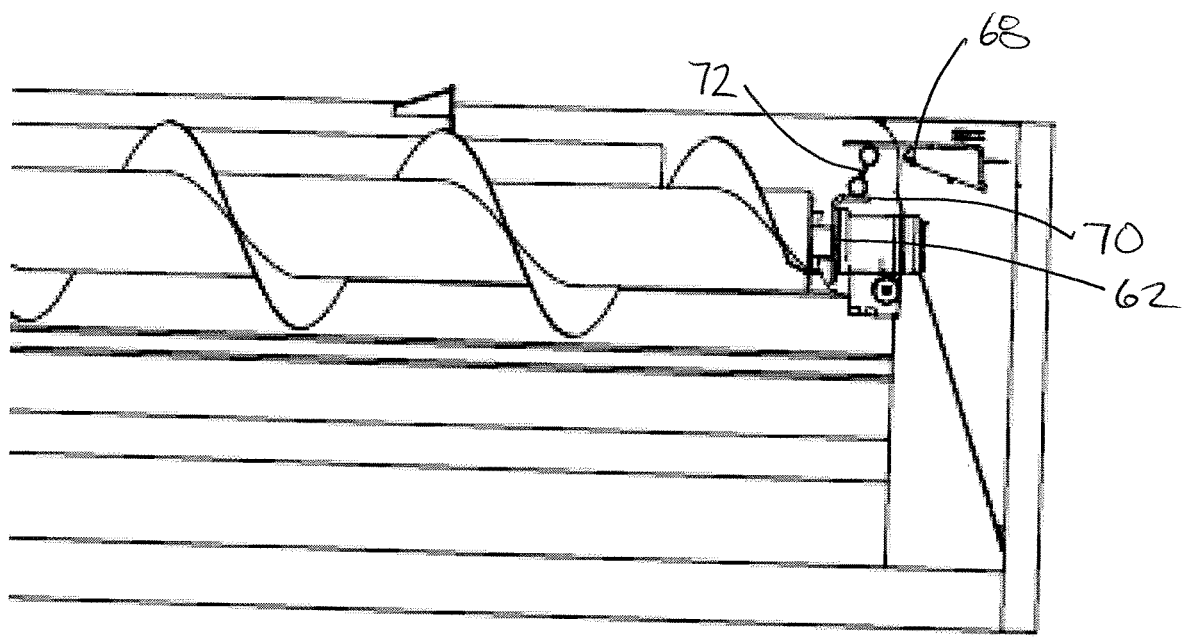
FIG. 13 is a front elevational view of the cross auger mounting device according to the second embodiment of FIG. 10 in which the outer end of the header frame is deflected upwardly from the neutral orientation relative to the centre frame section.
Figure 14:
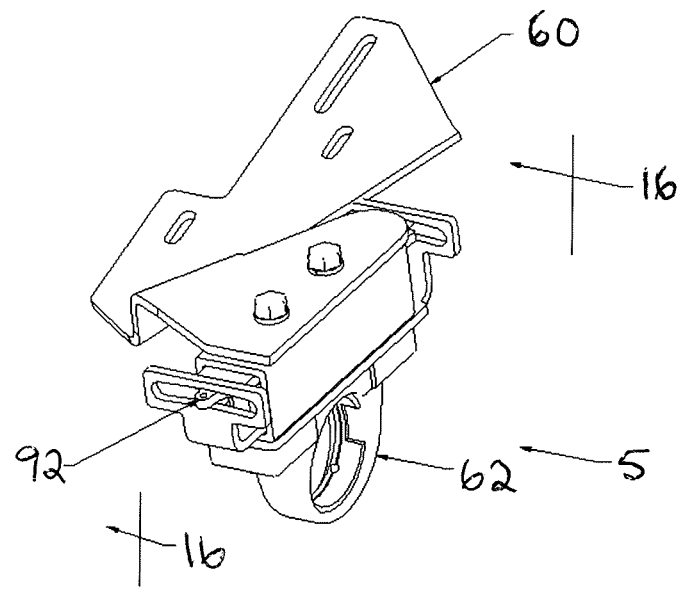
FIG. 14 is a perspective view of the cross auger mounting device according to a third embodiment of the present invention.
Figure 15:
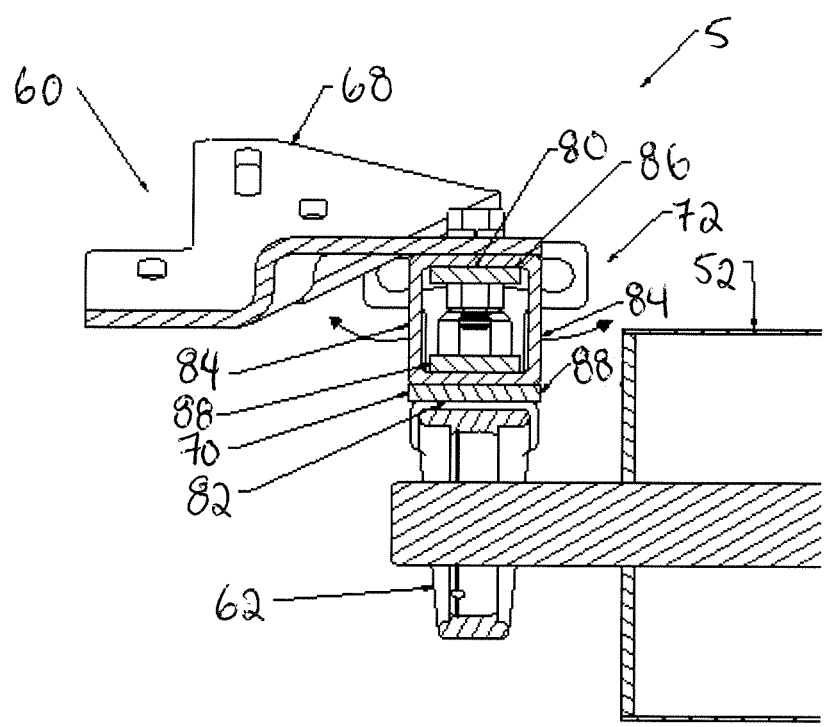
FIG. 15 is a schematic representation of the cross auger mounting device according to the third embodiment of FIG. 14.
Figure 16:
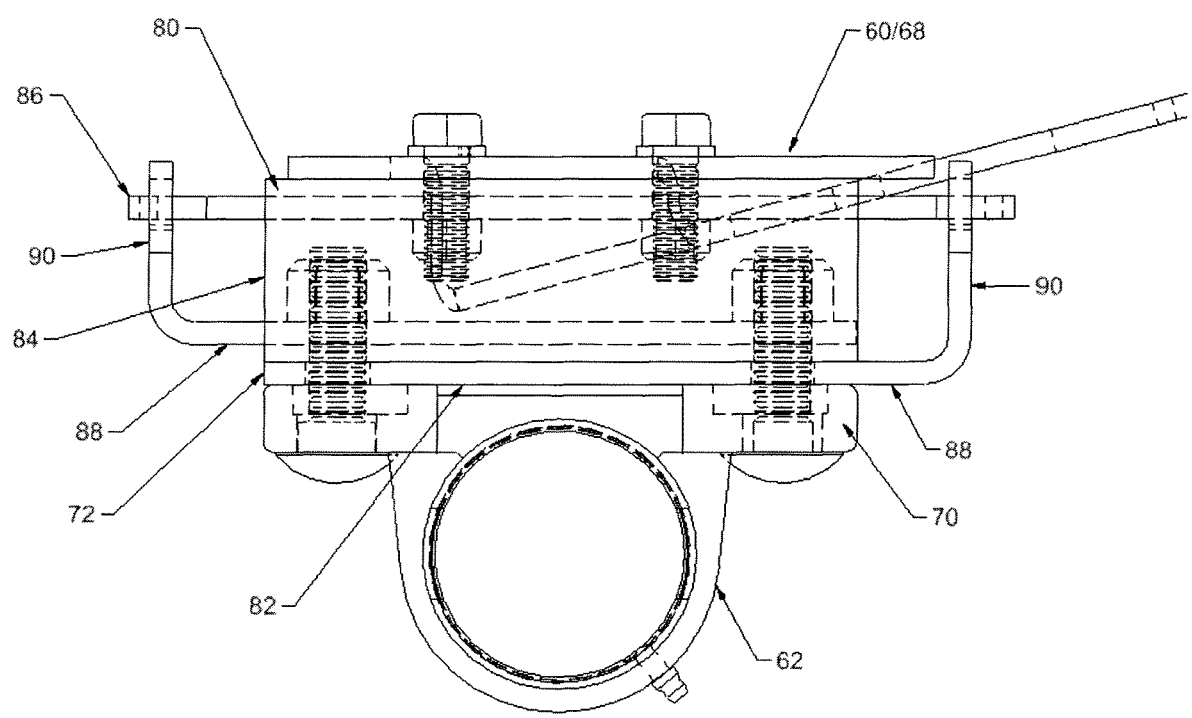
FIG. 16 is a sectional view along the line 16-16 of the cross auger mounting device in FIG. 14.
Figure 17:
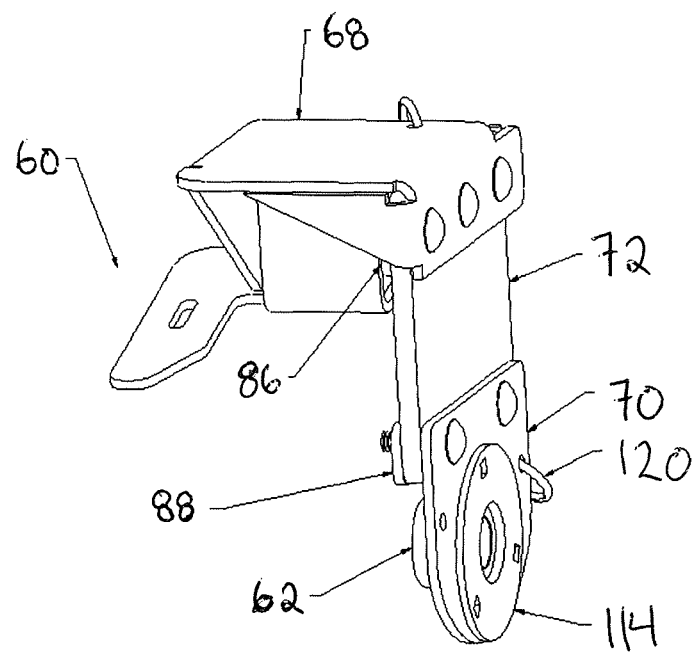
FIG. 17 is a perspective view of the cross auger mounting device according to a fourth embodiment of the present invention.
Figure 18:
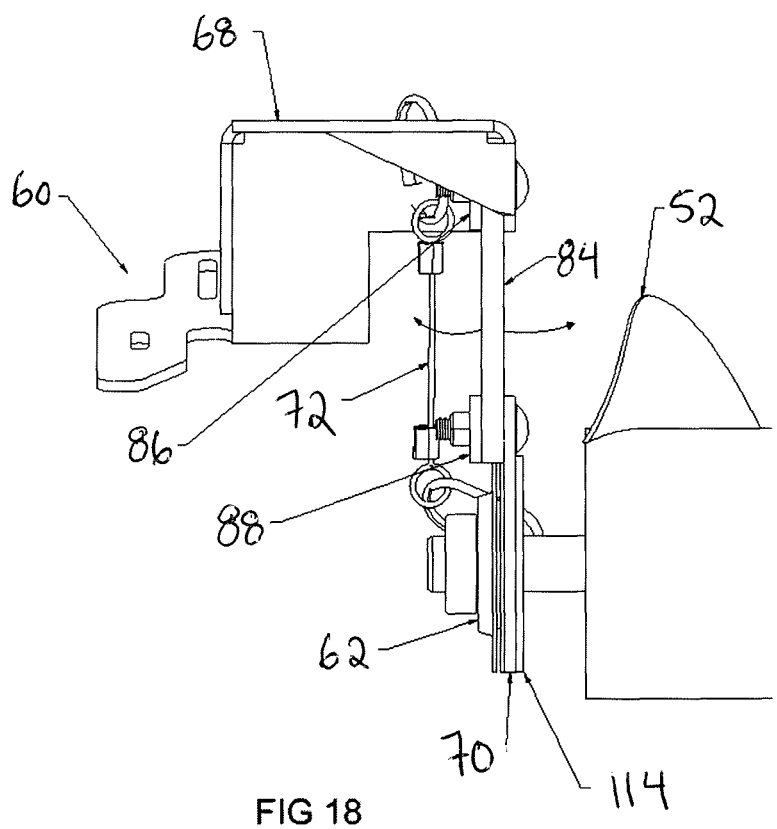
FIG. 18 is a front elevational view of the cross auger mounting device according to the fourth embodiment of FIG. 17.
Figure 19:
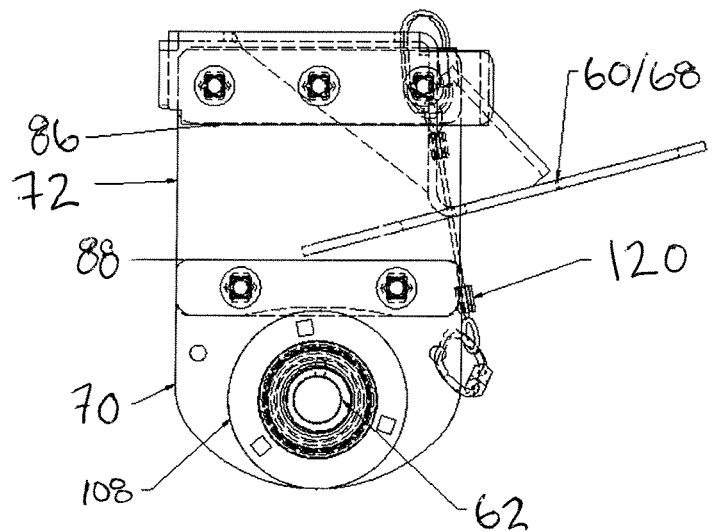
FIG. 19 is an end elevational view of the cross auger mounting device according to the fourth embodiment of FIG. 17.
Figure 20:
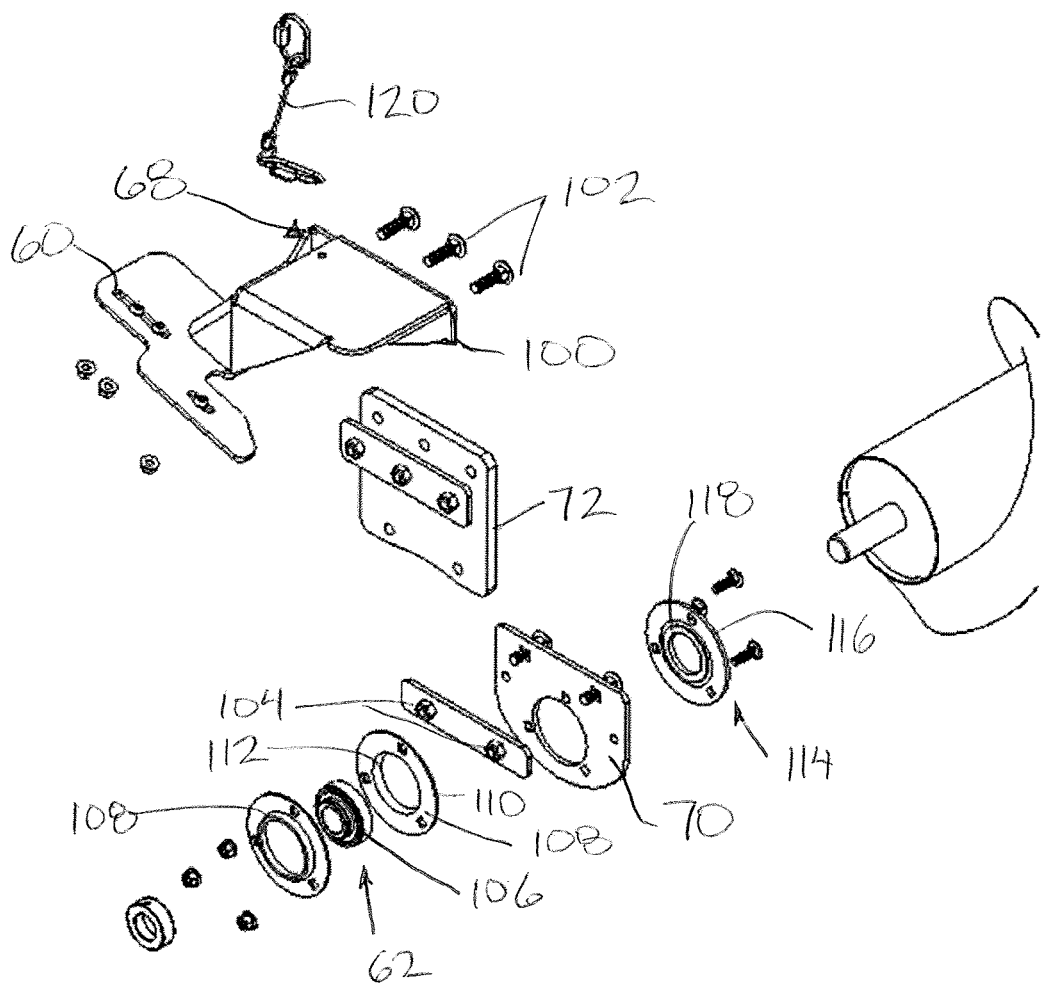
FIG. 20 is an exploded perspective view of the cross auger mounting device according to the fourth embodiment of FIG. 17.

Turning now to the third embodiment of FIGS. 12 through 14, in this instance the first mounting structure 70 comprises a rigid bracket fixed onto the support bracket 60 of the header frame. The second mounting structure 70 comprises a rigid mounting plate on the bearing housing 62. The flexible mounting arrangement in this instance comprises a resilient member 72 which is coupled between the first mounting structure and the second mounting structure such that the resilient member is resiliently deformed as the bearing housing is moved relative to the outer end of the end frame section of the header in the lateral direction that the cross auger shaft extends. In this manner the resilient member undergoes a bending deflection as the bearing housing is moved relative to the outer end of the header frame.

The resilient member 72 comprises a square tube having a top flange 80 which is bolted to the base plate 68, a bottom flange 82 which is bolted to the mounting plate 70 of the bearing housing, and two side walls 84 which extend parallel and spaced apart from one another between opposing side edges of the top flange and the bottom flange respectively. A longitudinal axis of the square tube is oriented generally in the forward working direction of the header. In this manner the two side walls 84 function like parallel links which undergo bending at the junction of the side wall to the top and bottom flanges respectively. In this manner the bottom flange remains generally parallel to the top flange while being displaced through an arcuate path about an axis oriented generally in the forward working direction similar to the configuration of a parallel four bar linkage.

The mounting device 5 in this instance further comprises a ledge member 86 comprised of a rigid plate bolted underneath the top flange 80 of the resilient member to provide the function of a washer that secures the top flange 80 against the mounting plate of the first mounting structure 68. The ledge member 86 also protrudes axially outward beyond both ends of the resilient member to define an opposing pair of ledges.

A pair of catch members 88 are mounted by bolting to the mounting plate 70 of the bearing housing for cooperation with the ledges defined at opposing ends of the ledge member 86 respectively. Each catch member comprises a rigid plate in bolted connection with the bottom flange 82 such that one rigid plate spans the top side of the bottom flange while the other rigid plate spans the bottom side of the bottom flange to again function as a washer securely gripping the bottom of the resilient member therebetween.

In addition to the rigid plate forming the base of each catch member, each catch member also includes an upright retention flange 90 extending upwardly from one end of the rigid plate so that the retention flanges 90 are at opposing ends of the resilient member 72 for cooperation with the opposing ledges of the ledge member 86 respectively. More particularly each retention flange includes a slot 92 formed therein which is elongate in the lateral direction that the cross auger extends so as to receive a protruding end portion of the ledge member 86 extending therethrough. The slot 92 has greater dimensions in the lateral direction than the protruding portion of the ledge member so as to allow freedom of movement of the catch member in the lateral direction that the cross auger extends relative to the ledge member.

In this manner the catch members cooperating with the ledge member do not interfere with the movement of the bearing housing 62 relative to the support bracket 60 on the outer end of the header frame as dictated by the bending of the side walls of the resilient member 72, however, should the resilient member break in any manner, the rigid bolted connection of the bearing housing to the catch member with the rigid connection of the ledge member 86 to the support bracket 60 would enable the weight at the outer end of the corresponding shaft section 52 of the cross auger to be carried by the retention flanges of the catch members becoming engaged upon the opposing ledges at opposing ends of the ledge member 86 to prevent damaging other components of the header.

Turning now to the fourth embodiment of the mounting device 5 as shown in FIGS. 17 through 20, the first mounting structure 68 in this instance is part of the mounting bracket 60 and comprises a mounting flange 100 oriented generally perpendicularly to an axis of rotation of the cross auger assembly in a neutral position of the end frame portions relative to the central frame portion of the harvesting header. The flexible arrangement 72 in this instance comprises a resilient member formed is a flat rectangular sheet of flexible material with sufficient tensile strength to support the weight of the end of the cross auger assembly suspended therefrom. A top row of fasters 102 are coupled through the top end of the resilient member 72 between the mounting flange 100 of the first mounting structure and a backing strip also formed of rigid plate material at the opposing side of the resilient sheet of material.

The second mounting structure 70 in this instance comprises another rigid plate which is mounted along the bottom edge of the resilient member 72 so as to lie substantially coplanar with the mounting flange 100 thereabove in the neutral position of the cross auger assembly while being spaced below the mounting flange by a height of the resilient member 72. The top edge of the rigid plate 70 is coupled along the bottom edge of the resilient member 72 by a bottom row of fasters 104 which are coupled through the resilient member between the rigid plate 70 on one side and a backing strip on the opposing side which is also formed of rigid plate material.

The rigid plate 70 includes a circular opening formed therein at a location spaced below the fasteners for mounting a portion of the bearing 62 in fixed relation to the rigid plate 70 while receiving the end portion of the cross auger shaft assembly through the opening. The bearing 62 in this instance comprises an inner bearing member 106 comprising a ring of rollers or balls contained within a housing that receives the shaft of the cross auger assembly therein and for rotation of the inner bearing member relative to the shaft about a common axis that is concentric or coaxial with the shaft. The outer wall of the inner bearing member 106 is partly spherical and is received within the surrounding outer bearing member 108. The outer bearing member includes a mounting flange 110 suited for mounting about the periphery of the opening in the rigid plate 70 and an inner bearing surface 112 supported within the mounting flange 110 defining a partly spherical surface supporting the spherical outer wall of the inner bearing member 106 therein. The outer bearing member 108 is formed in two halves so that the mounting flange 110 is similarly formed in two halves which are fastened at opposing sides of the rigid plate 70 to contain the inner bearing member 106 therebetween. The mating spherical surfaces allow for the mounting flange 110 to be varied in angular orientation relative to the axis of rotation of the cross auger shaft assembly from the neutral orientation in which the mounting flange lies generally perpendicularly to the axis of rotation.

The mounting device 5 in this instance further includes a locking member 114 which serves to limit the angular variation of the axis of the inner bearing member relative to the mounting flange of the outer bearing member. More particularly the locking member includes an outer flange 116 which fastens to the flange of the outer bearing member 108 in fixed relation therewith, and a collar portion 118 which is fixed and integral in relation to the outer flange and which is shaped for abutment against the end face of the inner bearing member 106 in the neutral position thereof to retain the inner bearing member in the neutral position in which the axis of the inner bearing member and the axis of rotation of the shaft member remain perpendicular to the mounting flange 110 of the outer bearing member. In this manner, any variance in the lateral position of the end of the cross auger shaft assembly relative to the end of the flexible frame of the harvesting header tends to force the deflection of the resilient member 72 while the inner bearing member 106 remains in the neutral orientation relative to the outer bearing member 108.

A suitable safety tether 120 is also provided for providing an additional flexible coupling between the second mounting structure 70 and the first mounting structure 68 to support the weight of the end of the auger assembly in the event that the resilient member 72 undergoes a failure. The safety tether 120 is an elongate, flexible, non-elastic cord connected between coupling rings at opposing ends thereof which are pivotally retained on the first mounting structure and the second mounting structure respectively. The length of the tether is sufficient that the tether does not interfere with the flexing of the resilient member 72 throughout the full range of pivotal movement of the end frame portions relative to the centre frame portion of the flexible header frame while providing adequate support to the cross auger assembly in the event of any failure of the resilient member 72.

Since various modifications can be made in my invention as herein above described, it is intended that all matter contained in the accompanying specification shall be interpreted as illustrative only and not in a limiting sense.

The invention claimed is:

1. A mounting device for a cross auger in a crop harvesting header, in which the crop harvesting header comprises:
    a flexible main frame including a centre frame section for mounting onto a harvester and a pair of end frame sections extending laterally outwardly from the centre frame section in opposing lateral directions towards respective outer ends defining a width of the header for movement in a forward working direction generally at right angles to the width across ground including crop to be harvested in which the end sections are pivotal relative to the center frame section for following contours of the ground;
    a crop receiving table carried on the main frame across the width of the header;
    a cutter bar across a front of the table carrying a cutter knife operable for cutting the crop as the header is moved forwardly across the ground in the forward working direction for depositing the crop onto the table;
    a backboard extending upwardly from a rear of the table across the width of the header and including a rear discharge opening therein for discharging the crop from a central discharge location at the rear of the table;
    a first side draper for conveying cut crop along the receiving table from a first end of the header to the central discharge location;
    a second side draper for conveying cut crop along the receiving table from a second end of the header to the central discharge location;
    the cross auger including a cross auger shaft assembly rotatably carried on the main frame to extend in the lateral direction above the rear of the table between opposing ends of the cross auger shaft assembly, forwardly of the backboard and spaced above the first and second side drapers;
    the cross auger shaft assembly including auger flighting mounted thereon that is oriented for guiding cut crop from both ends of the header towards the central discharge location as the cross auger shaft assembly is rotated;
    a pair of bearing housings rotatably supporting the opposing ends of the cross auger shaft assembly therein respectively adjacent respective ones of the outer ends of the end frame sections;
    the mounting device comprising:
        a first mounting structure for mounting in fixed relation to the outer end of one of the end frame sections of the main frame;
        a second mounting structure for mounting in fixed relation to a corresponding one of the bearing housings; and
        a flexible mounting arrangement coupling the second mounting structure to the first mounting structure such that the bearing housing is movable relative to the respective outer end of the end frame section generally in the lateral direction that the cross auger shaft assembly extends as the end sections of the flexible main frame are pivoted relative to the center section of the flexible main frame;

wherein the flexible mounting arrangement comprises a pivot link which is pivotally coupled on one of the first and second mounting structures about a first pivot axis and which is pivotally coupled on another one of the first and second mounting structures about a second pivot axis spaced below the first pivot axis, such that the bearing housing is movable relative to the respective outer end of the end frame section generally in the lateral direction that the cross auger shaft assembly extends as the pivot link is pivoted relative to the first and second mounting structures.

2. The mounting device according to claim 1 wherein the first and second pivot axis are oriented generally in the forward working direction of the header.

3. The mounting device according to claim 1 wherein the pivot link is pivotally coupled to the first mounting structure about the first axis and is pivotally coupled to the second mounting structure about the second pivot axis such that the bearing housing is suspended below the first mounting structure that is fixedly mounted on the outer end of the main frame of the header.

4. A mounting device for a cross auger in a crop harvesting header, in which the crop harvesting header comprises:
a flexible main frame including a centre frame section for mounting onto a harvester and a pair of end frame sections extending laterally outwardly from the centre frame section in opposing lateral directions towards respective outer ends defining a width of the header for movement in a forward working direction generally at right angles to the width across ground including crop to be harvested in which the end sections are pivotal relative to the center frame section for following contours of the ground;
a crop receiving table carried on the main frame across the width of the header;
a cutter bar across a front of the table carrying a cutter knife operable for cutting the crop as the header is moved forwardly across the ground in the forward working direction for depositing the crop onto the table;
a backboard extending upwardly from a rear of the table across the width of the header and including a rear discharge opening therein for discharging the crop from a central discharge location at the rear of the table;
a first side draper for conveying cut crop along the receiving table from a first end of the header to the central discharge location;
a second side draper for conveying cut crop along the receiving table from a second end of the header to the central discharge location;
the cross auger including a cross auger shaft assembly rotatably carried on the main frame to extend in the lateral direction above the rear of the table between opposing ends of the cross auger shaft assembly, forwardly of the backboard and spaced above the first and second side drapers;
the cross auger shaft assembly including auger flighting mounted thereon that is oriented for guiding cut crop from both ends of the header towards the central discharge location as the cross auger shaft assembly is rotated;
a pair of bearing housings rotatably supporting the opposing ends of the cross auger shaft assembly therein respectively adjacent respective ones of the outer ends of the end frame sections;
the mounting device comprising:
a first mounting structure for mounting in fixed relation to the outer end of one of the end frame sections of the main frame;
a second mounting structure for mounting in fixed relation to a corresponding one of the bearing housings; and
a flexible mounting arrangement coupling the second mounting structure to the first mounting structure such that the bearing housing is movable relative to the respective outer end of the end frame section generally in the lateral direction that the cross auger shaft assembly extends as the end sections of the flexible main frame are pivoted relative to the center section of the flexible main frame;
wherein the flexible mounting arrangement comprises a resilient member supported between the first mounting structure and the second mounting structure such that the resilient member is resiliently deformed as the bearing housing is moved relative to the respective outer end of the end frame section generally in the lateral direction that the cross auger shaft assembly extends.

5. The mounting device according to claim 4 wherein the resilient member undergoes a bending deflection as the bearing housing is moved relative to the respective outer end of the end frame section generally in the lateral direction that the cross auger shaft assembly extends.

6. The mounting device according to claim 5 wherein the resilient member comprising a pair of parallel links connected in an upright orientation between the first and second mounting structures at spaced apart positions in the lateral direction, the parallel links being bendable together as the bearing housing is moved relative to the respective outer end of the end frame section generally in the lateral direction that the cross auger shaft assembly extends.

7. The mounting device according to claim 4 wherein the mounting device further comprises a rigid ledge member coupled to the first mounting structure and a rigid catch member coupled to the second mounting structure which is supported above the ledge member, the catch member being freely movable relative to the ledge member in the lateral direction, and the ledge member being arranged to support the catch member thereon to carry the bearing housing on the outer end of the main frame in the event of breakage of the resilient member.

8. The mounting device according to claim 5 wherein the resilient member comprises a sheet of material arranged to be oriented perpendicularly to the cross auger shaft assembly in a neutral orientation of the end frame sections relative to the centre frame section of the flexible main frame.

9. The mounting device according to claim 5 further comprising a flexible, non-elastic member connected between the first and second mounting structures independently of the flexible mounting arrangement.

10. The mounting device according to claim 5 in combination with the bearing housings in which the bearing housings each comprise (i) an inner bearing member supported coaxially with an axis of rotation of the cross auger shaft assembly and (ii) an outer bearing member having a mounting flange connected in fixed relation to the second mounting structure and an inner bearing surface that is partly spherical and that supports the inner bearing member therein such that the mounting flange is angularly adjustable relative to the axis of rotation of the cross auger shaft assembly, wherein the mounting device further comprises a mounting member which is mounted on the second mounting structure and which includes a collar portion engaged with the inner bearing member such that the mounting flange is held at a fixed angular orientation relative to the axis of rotation of the cross auger shaft assembly.

\* \* \* \* \*